Dec. 19, 1967   C. A. SMITH   3,358,936
MANURE SPREADER
Filed April 1, 1965   2 Sheets-Sheet 1
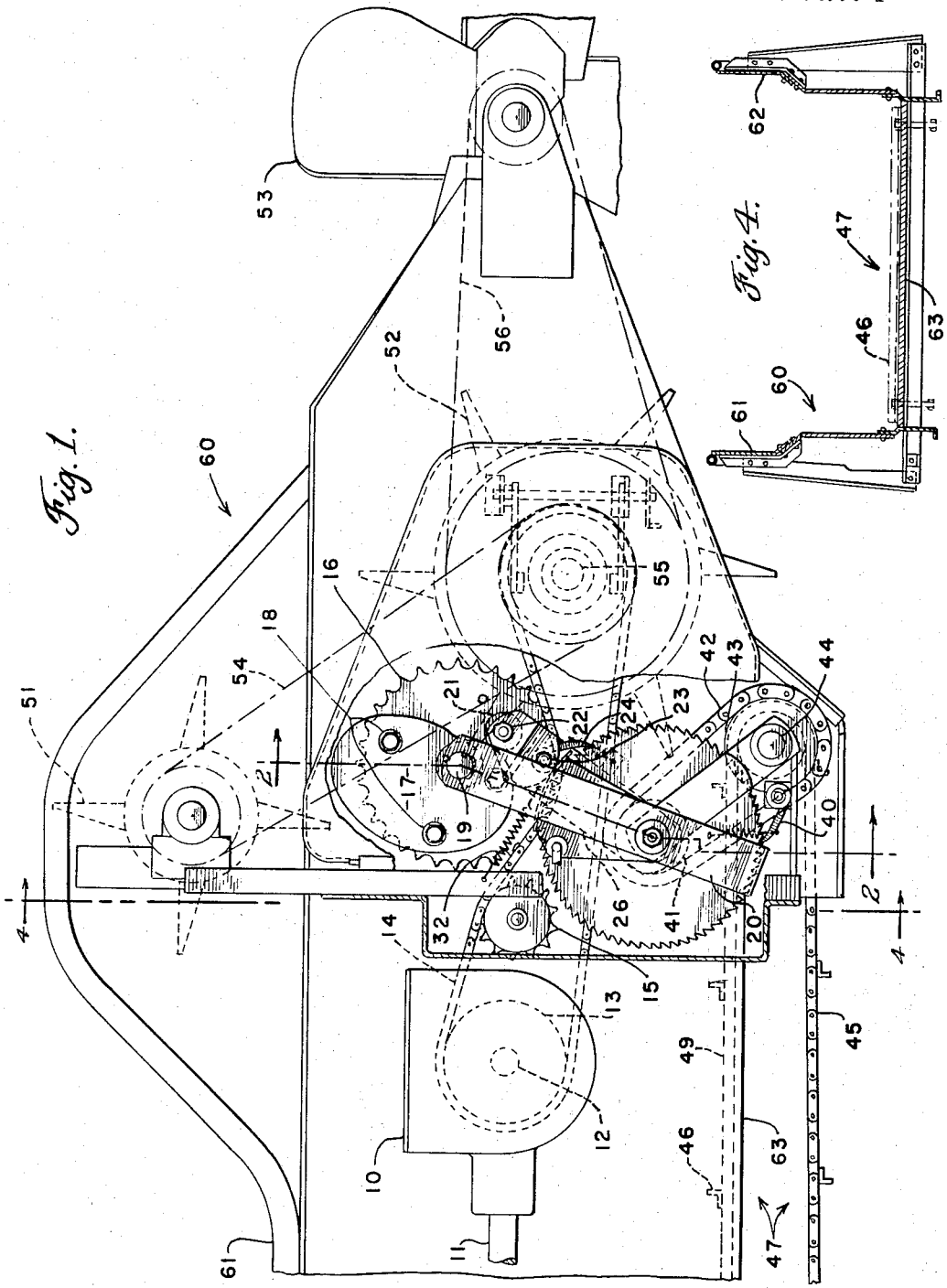
INVENTOR.
Charles A. Smith
BY
ATTORNEY Dec. 19, 1967  C. A. SMITH  3,358,936
MANURE SPREADER
Filed April 1, 1965  2 Sheets-Sheet 2
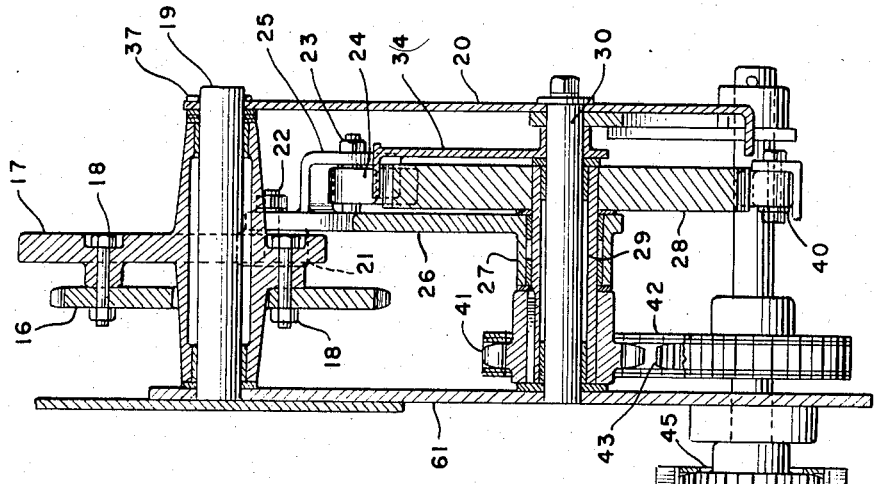
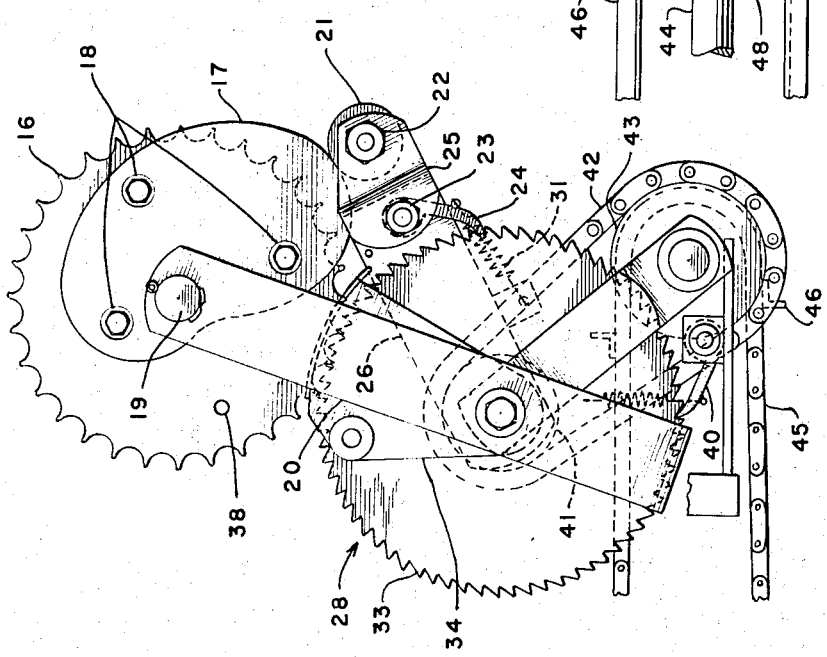
INVENTOR.
Charles A. Smith
BY
Joseph C. Brown
ATTORNEY

United States Patent Office

3,358,936
Patented Dec. 19, 1967

3,358,936
MANURE SPREADER
Charles A. Smith, New Holland, Pa., assignor to Sperry Rand Corporation, New Holland, Pa., a corporation of Delaware
Filed Apr. 1, 1965, Ser. No. 444,648
11 Claims. (Cl. 239—680)

ABSTRACT OF THE DISCLOSURE

A manure spreader having an apron conveyor which is driven by a cam-actuated ratchet wheel.

---

This invention relates to manure spreaders and the like and more particularly to improvements in the driving and control mechanism therefor.

It has been customary in conventional spreaders to provide feed means moving the manure or other material rearwardly and discharging it at the rear of the body, where it is acted upon by suitable distributing mechanism. One example of the type of spreader and feed means referred to is shown in U.S. Patent No. 2,699,337.

The most prevalent type of feed mechanism drive means, and the type shown in the above-noted patent, employs a power source which drives the feed apron conveyor through a ratchet wheel and pawl mechanism. Worm gear drives are also used to drive the apron conveyors on existing wagons. The worm gear drive provides power in a smooth even movement which feeds material continuously to the spreading elements, and the drive is such that sufficient ground clearance is provided in the area of the spreader where the drive is located. The worm gear drive does not have wide acceptance, however, because it is not readily adaptable to feeding at variable rates of apron speed, and it has a relatively high first cost.

The pawl and ratchet drive has a relatively low first cost, is readily adapted to variable feed rates, and is easily maintained. In prior-art spreaders having pawl and ratchet drives, however, two main problems exist. The first of these is the problem of ground clearance on the rear end of the spreader box. In known devices, the ratchet wheel is attached directly to the apron conveyor drive shaft. When thus mounted, the wheel extends below the return apron reach and thereby reduces ground clearance. Also, it is necessary to provide extensive shielding for the ratchet wheel in this position so that the teeth do not become dirty and inoperative. The second problem in pawl and ratchet drives is in maintaining a smooth even movement of the conveyor. Normally the ratchet wheel is powered by a crank and is actuated only during one half of each drive wheel revolution. The resulting feeding movement is abrupt and uneven. Attempts have also been made to power the ratchet wheel by cams on the spreader axle and in other arrangements; but these designs have had only limited success, and none of them solved the clearance problem.

Accordingly, one object is to provide a manure spreader of the character described with a novel and improved drive means for the spreader feed and distributing mechanisms.

Another object of this invention is to provide a drive means that does not project below the spreader apron and thereby does not reduce the spreader ground clearance.

Another object of this invention is to provide a pawl and ratchet type feed drive means wherein the feed mechanism may be driven at multiple rates and which approaches the smooth continuous movement of a direct feed drive means.

A further object of this invention is to provide a feed drive means with a rotary drive element which may be reverse mounted to substantially double the life thereof.

A still further object of this invention is to provide a relatively simple driving mechanism for the feed and the distribution mechanism which has a long life and is economical to manufacture and operate.

Other objects of this invention will be apparent hereinafter from the specification and from the recital in the appended claims.

In the drawings:

FIG. 1 is a side elevational view of the spreader having feed mechanism drive means constructed according to the invention and showing the novel arrangement of the ratchet wheel and drive means therefor;

FIG. 2 is on a somewhat larger scale than FIG. 1 and is a cross section on the irregular line 2—2 of FIG. 1;

FIG. 3 is also on an enlarged scale and shows the cam drive with the cam in a final drive position after having advanced the ratchet wheel and apron drive.

FIG. 4 is a view on line 4—4 of FIG. 1 showing the construction of the spreader side walls.

Referring now to the drawings by numerals of reference, 60 denotes a manure spreader comprising side walls 61 and 62, beaters 51 and 52 journalled on the side walls, and a distributing mechanism 53 journalled at the extreme rear end of the spreader. Operative for travel across the floor 63 is a feed mechanism comprising an apron 47 having a pair of fore-and-aft extending chains 45 and transversely extending slats 46 spaced from each other and operative to move material in the box from the forward end toward the discharge end. When viewed as shown in FIG. 1, the upper reach 49 of apron 47 travels rearwardly and around sprockets 43.

Drive means for the feed mechanism comprises a gearbox 10 on side wall 61, a feed input shaft 11 which derives its power from a connection with the tractor power-take-off, not shown. Output shaft 12 from gearbox 10 has a sprocket 13 thereon which mates with a drive chain 14. Drive chain 14 extends from sprocket 13 past an idler gear 15 to a driven sprocket 16 which pivots about shaft 19 extending from side wall 61 through vertical structural element 20 and secured thereto by key 37. Drive chain 14 also passes around a drive sprocket on beater 52. As best shown in FIG. 2, cam 17 is rotatably mounted on shaft 19; the cam is driven by sprocket 16 connected thereto by bolts 18.

It will be noted, as shown in FIG. 3, that four bolt holes 38 have been provided in sprocket 16. The sprocket may be reversed from its position in FIGS. 2 and 3, and in each of the sprocket positions one set of three holes 38 will be used to mount it to cam 17. Since the drive chain 14 contacts only one side of each sprocket tooth in any given position of the sprocket, the wear life of the sprocket is substantially doubled by reversing the sprocket. Thus, the sprocket may be formed from a material such as cast iron instead of more expensive steel.

A ratchet and pawl mechanism is mounted below cam 17 and driven thereby. The ratchet and pawl mechanism comprises a ratchet wheel 28 having teeth 33 on its outer periphery and is keyed to a sleeve 29 which is journalled on shaft 30. Shaft 30 extends between side wall 61 and vertical structural element 20. A radially extending arm 26 is journalled on sleeve 29 and oscillates thereabout. On the radially outward end of arm 26, a cam follower or roller 21 is rotatably mounted on fastener 22 which is attached to arm 26. Pawl 24 is rotatably mounted on fastener 23 connected to offset portion 25 of arm 26, and its free end is biased against ratchet wheel 28 by spring 31. As best shown in FIG. 1, arm 26 and the roller 21 thereon are biased against cam 17 by spring 32. A holding pawl 40 prevents retrogressive movement of the ratchet wheel.

A sprocket 41 is keyed to sleeve 29 at a point axially spaced from ratchet wheel 28, and sprocket 41 rotates with sleeve 29 as it is driven by the ratchet wheel. An endless chain 42 extends between sprocket 41 and sprocket 43 on the apron conveyor shaft 44. An axially inwardly spaced sprocket 48 on shaft 44 meshes with drive chain 45 to drive the apron conveyor means. An identical sprocket 48, not shown, is located on the opposite side of the spreader and meshes with a second drive chain in the same manner as sprocket 48 and drive chain 45. It is, of course, understood that conventional sprocket means, not shown, are provided on the forward end of the wagon bed for the forward portion of the endless conveyor chains 45.

A lower rotary beater 52 is driven by drive chain 14 from the gearbox 10. As shown in FIG. 1, the upper rotary beater 51 is driven by an endless drive chain 54 which mates with a sprocket on the lower rotary beater shaft 55. The distributing mechanism 53 is driven by endless chain 56 from a sprocket on the lower rotary beater shaft.

Adjustment of the rate of feeding of the material to the distributing mechanism is attained through a shroud or baffle 34 (FIGS. 2 and 3) extending over the toothed periphery of ratchet wheel 28. The baffle 34 may be interposed to varying degrees between the oscillating ratchet pawl 24 and the teeth 33 of ratchet wheel 28 to thus block off any desired number of these teeth from engagement by the pawl.

In operation, power is supplied to gearbox 10 through shaft 11 which is adapted to be connected to a tractor power-take-off (see FIG. 1). Drive chain 14 is driven by rotary drive element 13 on the gearbox 10. As drive chain 14 moves through its driven path it serves to rotate sprocket 16 and the sprocket on the lower rotary beater. As sprocket 16 rotates, the cam 17 mounted thereto is rotated about stationary shaft 19. Roller 21 which is biased against the outer peripheral surface of cam 17 rides on the cam and serves to oscillate arm 26 which drives the ratchet wheel 28. Cam 17 is so designed that the arm 26 will be moved in a clockwise direction through 300 degrees of each cam revolution and will move backward in a counterclockwise direction through the remaining 60 degrees. The rotational movement of the ratchet wheel 28 is transmitted through sleeve 29 to sprocket 41 which transmits the driving moment to the apron conveyor shaft through chain 42 and sprocket 43. As previously noted, beater 51 and distributing mechanism 53 will be driven through means connected to the lower beater shaft 55.

It will be seen from the foregoing description that an extremely smooth and efficient means is provided to drive the ratchet and pawl in the apron feed mechanism. One of the main advantages of the disclosed drive means is the extremely long driving stroke which is accomplished by this particular design of the cam. Another important feature is the compact drive means which results from this particular design. As shown in FIG. 1, the drive mechanism extends from the return apron drive upwardly. Thus, the ground clearance of the spreader at the rear end is determined by the particular height of the return apron feed chain and not by the ratchet wheel, as in the known prior art devices. The disclosed drive also has extremely good wear characteristics. As previously noted, the drive sprocket may be reversed to substantially double the life of this element.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a wagon for spreading manure and the like, a generally horizontally extending box having a floor, a pair of upright spaced longitudinal side walls and a discharge end, an apron movable over said floor toward said discharge end and having a return portion extending under the floor, an apron shaft having a driven wheel thereon for moving the apron, a gearbox on one of said sides, a power input shaft into said gearbox, an output shaft coming from said gearbox having a rotary drive element thereon, a cam pivotally mounted on a first shaft extending from one side wall and spaced from said drive element, a rotary driven element connected to said cam, a first endless member operatively connecting said drive and driven elements, a second shaft extending from said one side and spaced below said first shaft, a sleeve journalled on said shaft, a ratchet wheel fixed to said sleeve for rotation about said shaft, a radially extending arm journalled on said sleeve and having a roller on an end radially outward from said second shaft, said roller being in contact with said cam and spring biased thereagainst, a pawl rotatably mounted on said arm, said pawl being engageable with ratchet teeth on the outer periphery of said ratchet wheel, a drive wheel fixedly attached on said sleeve and axially spaced from said ratchet wheel, a second endless member operatively connecting said drive wheel to said driven wheel on said apron shaft, said pawl being oscillated by the action of said cam on said roller when power is supplied through said gearbox to said rotary driven element and said sleeve being rotated by said ratchet wheel when engaged by said pawl.

2. In a wagon, as recited in claim 1, wherein the bottom periphery of said ratchet wheel is above said apron return portion.

3. In a wagon, as recited in claim 1, wherein said rotary driven element is a sprocket wheel having a pair of substantially flat faces and sprocket teeth on its outer periphery, means is provided for mounting said cam to either of said faces to increase the wear life of said sprocket.

4. In a wagon, as recited in claim 1, wherein said rotary driven element is a sprocket wheel having a pair of substantially flat faces and sprocket teeth on its outer periphery, means is provided for mounting said cam to either of said faces, said first endless member is a chain consisting of a plurality of links, said links bear against said sprocket teeth on a first side thereof as said chain is driven in one direction and said cam is mounted to a first face of said sprocket, and said links bear against said sprocket teeth on a side opposite said first side when said cam is mounted to a second face of said sprocket and said chain is driven in said one direction.

5. A wagon, as recited in claim 1, wherein said ratchet wheel is rotated by said pawl when said arm moves in a clockwise direction, and said arm is moved in a clockwise direction by said cam through approximately three hundred degrees of each revolution of said driven element.

6. A wagon, as recited in claim 1, wherein a rotary lower beater is journalled on said sides rearwardly of said shafts, said first endless member operatively connects said lower beater to said drive element, an upper rotary beater is journalled on said side walls above and substantially in vertical alignment with said shafts, said upper beater is operatively connected to said lower beater by a third endless member, whereby said beaters are rotated when said first endless member is driven by said first drive element.

7. A wagon, as recited in claim 6, wherein a distributing mechanism is journalled between said sides rearwardly of said rotary lower beater, said distributing mechanism is operatively connected to said lower beater by a fourth endless member, whereby said distributing mechanism is driven when said lower beater is driven.

8. In a manure spreader, a box having a horizontal bottom, a pair of spaced vertically extending side walls, and a discharge opening at a rearward end, a beater rotatably supported on said box rearward end and extending transversely relative to said side walls, a gearbox mounted on one of said side walls, said gearbox having a fore-and-aft extending input shaft connected to a source of power and a transverse output shaft driven thereby, a drive sprocket on said output shaft and rotatable therewith, a sprocket connected to said beater, an endless chain connecting said drive sprocket to said beater sprocket, an apron having an upper reach movable over the bottom of said box to convey manure toward said rearward end and said beater, said apron having a lower reach which returns beneath the box bottom, said apron passing around a drive shaft extending across said box rearward end adjacent said bottom, a driven sprocket rotatably supported on said one wall of said box between said drive and beater sprockets and in engagement with one reach of said chain to be rotated thereby, a ratchet wheel supported on said one side wall for rotation on an axis spaced upwardly from said apron drive shaft, an arm pivotally supported alongside said ratchet wheel, a drive pawl pivotally supported on said arm, spring means connected to said drive pawl to urge the pawl into driving engagement with teeth on said ratchet wheel, a cam connected to said driven sprocket and rotatable therewith, a cam follower connected to said arm and located in the path of travel of said cam, said cam follower being engaged by said cam on each rotation of said driven sprocket to pivot said arm and rotatably index said ratchet wheel through said drive pawl, a holding pawl operatively engaging said ratchet wheel and preventing retrogressive rotation thereof, and means connecting said ratchet wheel to said drive shaft whereby when the ratchet wheel is indexed said apron upper reach is moved toward said box rearward end.

9. In a manure spreader as recited in claim 8 wherein said driven sprocket is supported for selective mounting with one side or the other facing said box one side whereby the wear on the teeth of the sprocket may be equalized, and means being provided for selectively connecting said cam in one location on one side of said driven sprocket and connecting the cam in another location on the other side of the driven sprocket.

10. In a manure spreader as recited in claim 8 wherein said means connecting said ratchet wheel to said apron drive shaft comprises a pair of sprockets, one coaxial with and connected to said ratchet wheel and the other coaxial with and connected to said drive shaft, and an endless chain connecting said pair of sprockets.

11. In a manure spreader of the class in which a feed mechanism is operative to discharge material rearwardly from a longitudinally disposed body having a pair of side walls for action by distributing mechanism, the combination with said spreader of a rotary drive element mounted on one side wall and means transmitting rotation thereto at a constant speed, driving mechanism between said element and the distributing mechanism, a ratchet wheel rotatably supported on said one side wall in driving relation with said feed mechanism, an arm mounted for oscillation about the axis of said ratchet wheel and a pawl carried by said arm for driving engagement with said wheel, means establishing an operative driving connection between said arm and said drive element to cause oscillation of said arm, said means including a rotatable cam having an outer periphery in operative contact with said arm, and said feed mechanism being substantially even with the lowermost portions of said ratchet wheel and drive to said feed mechanism whereby the ground clearance of said spreader at the rear end thereof is determined by the height of said feed mechanism.

References Cited
UNITED STATES PATENTS

| | | | |
|---|---|---|---|
| 2,256,815 | 9/1941 | Raney et al. | 275—6 |
| 2,699,337 | 1/1955 | Best | 275—5 |
| 2,807,234 | 9/1957 | Middlen | 275—3 X |
| 2,894,756 | 7/1959 | McDonough | 275—6 |
| 3,156,124 | 11/1964 | Miller | 74—116 X |

EVERETT W. KIRBY, *Primary Examiner.*

ABRAHAM G. STONE, *Examiner.*

J. R. OAKS, *Assistant Examiner.*